(12) United States Patent
Van Zeeland

(10) Patent No.: US 6,369,692 B1
(45) Date of Patent: *Apr. 9, 2002

(54) DIRECTIONALLY SENSITIVE SWITCH

(75) Inventor: Anthony J. Van Zeeland, Mesa, AZ (US)

(73) Assignee: Duraswitch Industries, Inc., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,600

(22) Filed: May 9, 2000

Related U.S. Application Data

(63) Continuation-in-part of application No. 09/324,567, filed on Jun. 2, 1999, now Pat. No. 6,069,552.

(51) Int. Cl.[7] .......................... H01C 10/50; H01H 9/00
(52) U.S. Cl. ...................... 338/200; 335/205; 335/206; 335/207; 200/6 R
(58) Field of Search ................................. 335/205, 206, 335/207; 200/511, 512, 562, 6 A, 6 R, 514; 273/148 B; 338/200

(56) References Cited

U.S. PATENT DOCUMENTS

| | | | | |
|---|---|---|---|---|
| 3,167,624 A | * | 1/1965 | Jones, Jr. ..................... 335/205 |
| 3,644,856 A | * | 2/1972 | Scott ........................... 335/207 |
| 4,409,450 A | * | 10/1983 | Blades ......................... 200/512 |
| 5,921,382 A | * | 7/1999 | Retter .......................... 200/514 |
| 6,069,552 A | * | 5/2000 | Van Zeeland ................. 338/92 |

\* cited by examiner

*Primary Examiner*—Karl D. Easthom
(74) *Attorney, Agent, or Firm*—Cook, Alex, McFarron, Manzo, Cummings & Mehler, Ltd.

(57) ABSTRACT

An electrical switch has spaced, facing coupler and carrier layers with a set of electrodes formed on the facing surfaces thereof. There is an aperture in the coupler layer. A conductive armature is disposed in the space between the coupler and carrier, aligned with the aperture. The coupler is a magnet and the armature is made of magnetic material so the armature is normally held in engagement with the coupler. A user can press on any part of the armature through the aperture to cause a first portion of the armature to break away from the armature and contact the electrodes on the carrier while a second portion of the armature remains in contact with the coupler. The electrodes are arranged to provide an output which is dependent upon the location of contact with the armature. The armature is rotatable to different positions. A resilient member may be interposed at the interface of an armature post and the carrier.

13 Claims, 5 Drawing Sheets

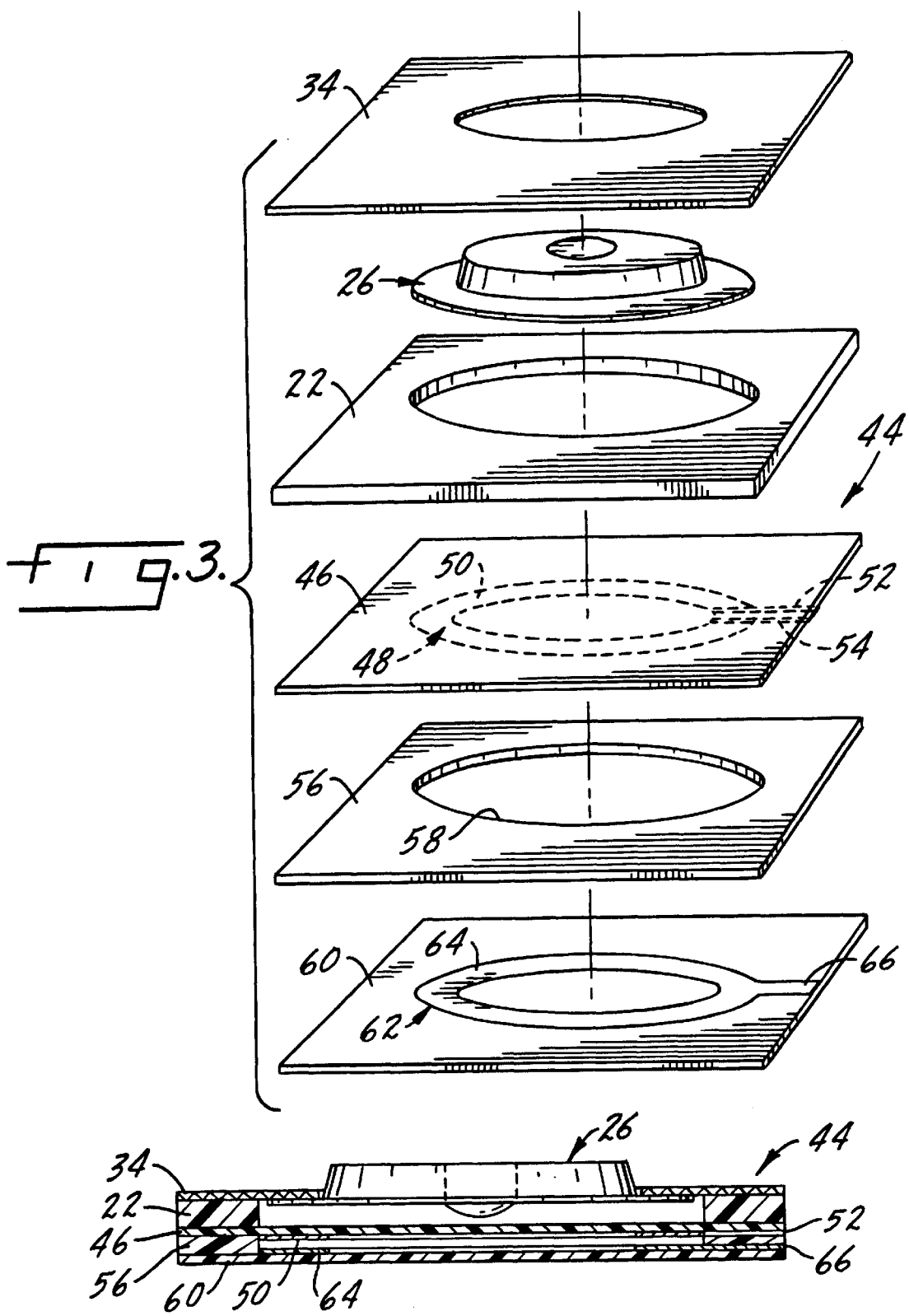

US 6,369,692 B1

DIRECTIONALLY SENSITIVE SWITCH

CROSS REFERENCE TO RELATED APPLICATION

This is a continuation-in-part of application Ser. No. 09/324,567, filed Jun. 2, 1999, now U.S. Pat. No. 6,069,552.

BACKGROUND OF THE INVENTION

This invention relates to an electrical switch that is sensitive to the location on its actuating surface where it is depressed by a user. The switch has particular application to a personal computer's pointing device, commonly known as a mouse. A continuing problem with laptop computers is providing a compact, reliable and easy to use pointing device. The conventional mouse that fits in a user's palm is not an acceptable pointing device in a laptop computer because a laptop is typically used where there is no convenient desk surface on which to manipulate a conventional mouse. A conventional mouse is also too large for storage in a laptop computer. As a result of these drawbacks, laptops have not been equipped with a conventional mouse but instead have had various switches, trackballs and/or miniature joysticks built into their keyboards for use as pointing devices. These have met with varying success but many users still find them unsatisfactory. Cost and reliability are other concerns with prior art laptop mice. The present invention provides an electrical switch that resolves these problems and makes an excellent mouse switch. However, the switch is not limited to a mouse application. It can used anywhere a directional indication is needed.

SUMMARY OF THE INVENTION

The present invention concerns an electrical switch of the type having a conductive armature movable into and out of contact with a set of electrodes. The electrodes may be arranged to have spaced pads with the armature moving into and out of shorting relation with these pads. Or the electrodes may form a resistive element of a potentiometer with the armature providing a take-off element. Other electrode arrangements are possible to provide a desired logic or output. In any case, the electrodes are arranged to provide a variable output dependent on where the armature contacts the electrodes.

The switch has a carrier sheet on which the electrodes are formed. A coupler layer lies adjacent the carrier. A spacer separates the coupler and carrier and defines a cavity in which a conductive armature is disposed. The coupler is a magnet and the armature is made of material that is affected by a magnet. An aperture in the coupler provides access to the armature. A user-supplied actuating force acting through the aperture tilts a first portion of the armature into contact with the electrodes while a second portion of the armature remains in contact with the coupler. Any part of the armature can be pressed into contact with the electrodes so a variable output is produced depending on where the user pressed the armature. The coupler magnet retracts the armature from the electrodes when the actuating force is removed.

An alternate form of the switch has a set of electrodes arranged in a series of segments on a substrate. A conductive armature is normally held spaced from the electrodes by a magnet. The armature can be depressed to contact one of the segments and a central common contact. The armature can also be rotated to align conductive bumps on its underside with a selected subset of the segments. A further variation has an armature with a plurality of local crowns extending through a spacer for actuation by a user. In another arrangement a membrane switch is incorporated into the substrate. Yet another embodiment employs a resilient post underneath the armature to provide flexibility between the armature and sub-strate.

BRIEF DESCRIPTION OF THE DRAWINGS

FIG. 3 is an exploded perspective view of the switch according to a second embodiment of the invention.

FIG. 4 is a section through the switch of FIG. 3.

DETAILED DESCRIPTION OF THE INVENTION

Figure 1:
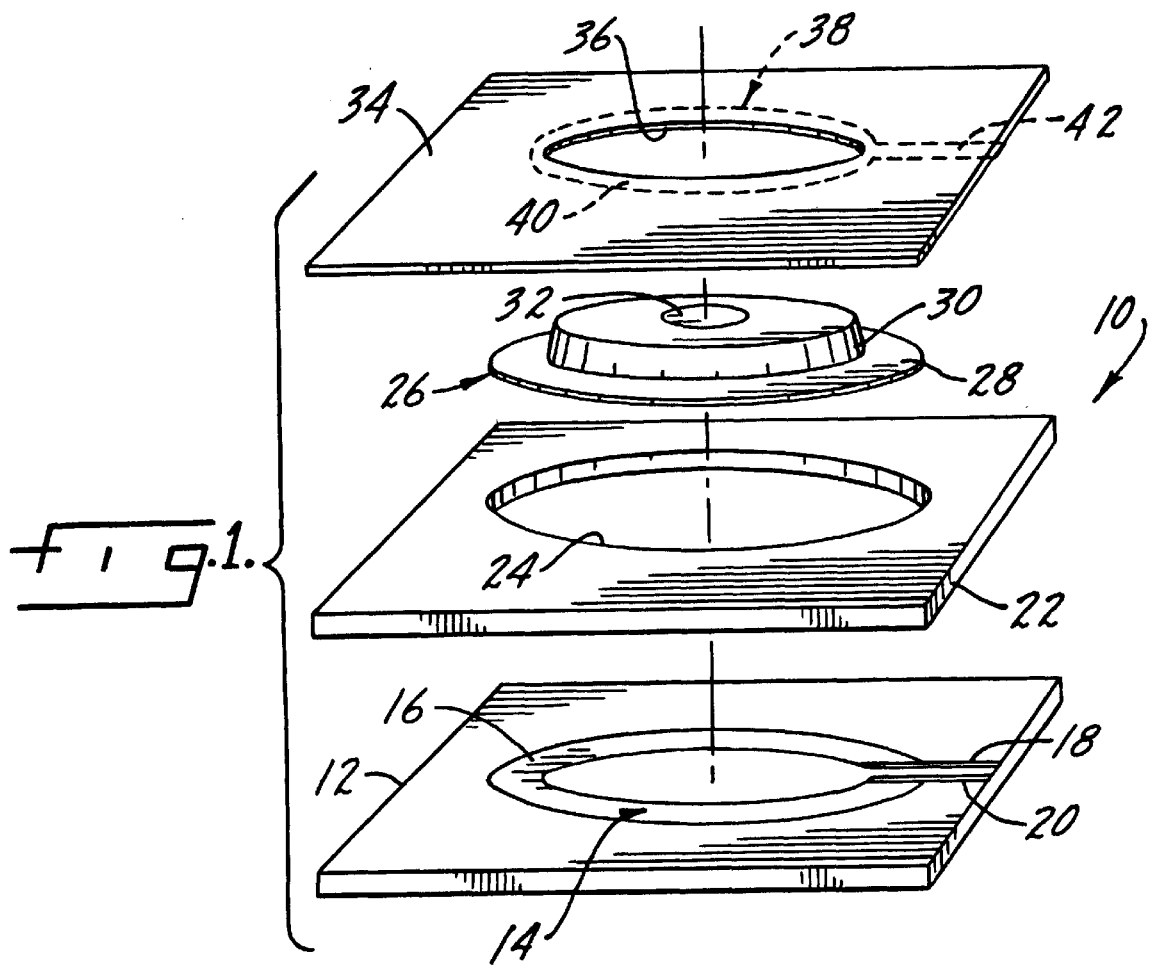
FIG. 1 is an exploded perspective view of the switch according to the present invention.
Figure 2:
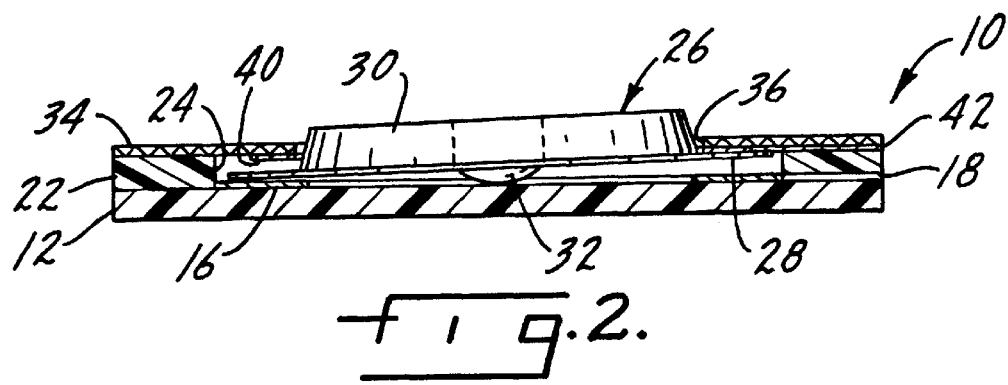
FIG. 2 is a section through the switch of FIG. 1.

FIGS. 1 and 2 illustrate a first embodiment of the switch 10 of the present invention. Describing the switch from the bottom up, a carrier layer or substrate 12 provides the base of the switch. The carrier is electrically insulating. It can be rigid or flexible as required by a particular application. The carrier layer can be made of a variety of materials depending on the application and environment. Polyester film, circuit boards and dielectric-coated thin steel sheets are possibilities. While only a single switch is shown in the illustrated embodiment, it will be understood that a single carrier layer could be used with multiple switches. In fact one of the advantages of the present invention is the ability to provide multiple switches in a very small space.

The carrier has a set of electrodes 14 formed on its upper surface. The electrodes may be formed by screen printing, etching or other suitable process. In this embodiment the electrodes 14 are arranged in the form of a potentiometer including a circular resistive element 16 and connecting leads 18 and 20. The resistive element is not a complete circle; it has a gap where the element terminates. Leads 18, 20 connect to these terminating points and extend to the edge of the carrier 12. The leads 18, 20 connect to suitable external circuitry (not shown). In this case the leads are connected to different voltages, e.g., one lead is connected to a voltage source and the other to ground. Accordingly, a variable voltage would be present around the circumference of the resistive element 16. The set of electrodes 14 further comprises a signal lead formed on the underside of the coupler layer, as will be described below.

A spacer 22 lies on top of the carrier 12. The spacer is made of insulating material. It has an opening 24 therein which defines a cavity between the carrier 12 and coupler layer described later. The opening 24 is aligned with the resistive element 14 so as to provide access thereto. In this embodiment the opening is slightly larger than the armature, which allows the spacer to perform an armature locating function, i.e., it prevents the armature from being displaced. However, the spacer could have alternate configurations in certain circumstances. For example, if the carrier and coupler are sufficiently rigid, the separating function of the spacer could be met by a spacer located only at the edges of the layers, with the interior fully open. Or portions of the spacer might cross over the electrodes to mechanically define separate portions of the electrodes. In any case, the spacer must at least partially separate the carrier and coupler layers.

An armature 26 fits in the spacer opening 24. The armature is made of electrically conductive, magnetic material. By magnetic material it is meant that the material is affected by a magnet. Steel is suitable. Preferably a steel armature would be plated with a noble or semi-noble metal such as silver, gold or tin. The armature shown has a generally flat rim 28 and a frusto-conical crown 30. The frusto-conical shape allows the crown to fit easily through an aperture in the coupler layer.

At the center of the crown is a post 32. The post may extend beneath the bottom of the crown where it serves as a fulcrum about which the rim tilts when actuated. The post may be spaced from the carrier 12 or it may be long enough to constantly engage the carrier. The post is an optional feature that is not always required. If the post is included it provides an additional option of building a switch into the post. That is, the set of electrodes may include leads which will open or close as the post moves up and down with the armature. Or the post may be made of rubber impregnated with conductive particles, e.g., carbon or iron particles. Again electrodes are provided to connect external electronics to the post. In this configuration the post can act as an acceleration switch in which its output varies with the pressure a user applies to the post. This is because the resistance of the impregnated rubber post varies with pressure. In the case of a mouse application, a rubber post would be employed to allow the user to control how fast a cursor moves. The harder the user pressed on the post, the faster the cursor would move. A further variation would be to make the post rigid and form the electrodes from a compressible material whose electrical output would vary, with the amount of pressure exerted by the user.

The switch 10 is completed by a coupler layer 34. The coupler is a magnet. Thus, it attracts the armature to it. An aperture 36 through the coupler 34 has a diameter slightly larger than that of the crown 30 at the rim 28. This permits the crown to fit into and through the aperture. The rim 28, however, has a larger diameter than the aperture 36 so the upper surface of the rim 28 engages the lower surface of the coupler surrounding the aperture 36. This prevents the armature from being separated from the coupler. Preferably, the height of the crown and the thickness of the coupler are such that the crown protrudes somewhat above the upper surface of the coupler. The upper surface may have suitable graphics indicating the switch's function or operating instructions. The graphics may be printed directly on the coupler or on an overlay film attached to the coupler.

As mentioned above, part of the set of electrodes 14 is carried by the underside of the coupler 34. A signal lead 38 is printed on the coupler. It has a pickup portion 40 and a connector lead 42. The pickup portion completely surrounds the aperture 36. It is wide enough to always maintain contact with some part of the rim 28. The connector lead 42 extends to an edge of the coupler where it connects to external electronics (not shown). In the arrangement shown the signal lead 38 acts as the wiper connection of a potentiometer.

The use, operation and function of the invention are as follows. When the switch is in an unactuated state, the magnetic attraction between the armature 26 and coupler 34 holds the armature in its open position. In the open position the entire armature is spaced from the carrier 12. The entire rim 28 engages the underside of the coupler, in engagement with the pickup portion 40 of signal lead 38. The resistive element 16 has the source voltage applied between its ends but no output is provided on signal lead 38 because there is no connection or contact between the signal lead and the resistive element.

When a user desires to activate the switch, he or she presses on an edge of the crown 30 of armature 26. Doing so will cause the rim underneath the point of pressure to break away from the coupler. The armature will pivot about the side of the rim opposite the point of pressure. The armature will tilt into contact with the resistive element 16. Contact between the rim 28 and the resistive element 16 causes a signal voltage to appear on the signal lead. The value of the signal voltage will depend on the value of the source voltage and the location of the contact on the resistive element. Since the source voltage is known, the signal voltage provides an indication of where the contact took place. For example, if the signal voltage is half of the source voltage, the armature/resistive element contact point would have to be half way around the circumference of the resistive element. Thus, it can be determined where on the armature the user applied the actuating pressure.

The post 32 prevents the user from breaking the entire armature away from the coupler. It assures that tilting of the armature will occur upon actuation, even if the user presses on the center of the crown 30.

While the electrodes 14 are arranged in the form of a potentiometer, it will be understood that other arrangements are possible. The term electrodes is intended to cover any desired arrangement of the electrical conductors. For example, the electrodes may be arranged into multiple sets of spaced contact pads to be shorted by an actuated armature. In this example one pad of an adjacent but spaced pair of pads has an applied source voltage while the other does not. Actuating the armature shorts the pads and causes an output to appear on the normally non-energized pad. Associated electronics can sense which pad was shorted, thereby identifying where the armature was pressed.

The switch of the present invention can be described as directionally sensitive because it can identify the location on the armature where it was pressed. This makes the switch useful in applications such as a computer mouse. If a user wants to move a cursor to the right, he or she would press on the right side of the armature. The same would be true of left, up, down or diagonal. If the accelerator feature of the post is supplied, harder pressure would make the cursor move faster. But the mouse is just one example of a specific application. Many others are possible. Just about any application requiring an up or down setting, e.g., temperature settings, radio or television station selection, could benefit from the present switch.

FIGS. 3 and 4 illustrate an alternate embodiment of the present invention. Switch 44 has a spacer 22, armature 26 and coupler 34 similar to that in FIGS. 1 and 2 so the description of these parts will not be repeated. The previous carrier layer 12, however, is replaced by a membrane layer 46. Membrane 46 is made of flexible material such as polyester. On the underside of the membrane is a portion of a set of electrodes 48. The illustrated electrode is similar to electrode 14 in that is has a resistive element 50 and leads 52 and 54. The leads connect to external electronics (not shown). Beneath the membrane 46 is a spacer 56 that has a central aperture 58. The spacer overlies a substrate 60 which may either be rigid or flexible as the application requires. The top surface of the substrate carries the remainder of the set of electrodes, in this case a signal lead 62 having a pickup portion 64 and connector lead 66, similar to signal lead 38.

The operation of the switch 44 is as follows. When the switch is in an unactuated state coupler 34 holds the armature out of contact with the membrane 46. When a user desires to activate the switch, he or she presses on an edge of the crown 30 of armature 26. Doing so will cause the rim underneath the point of pressure to break away from the coupler. The armature will pivot about the side of the rim opposite the point of pressure. The armature will tilt into contact with the top surface of the membrane 46. Contact between the rim 28 and the membrane causes the membrane to flex through the spacer opening 58, carrying the resistive element 50 into contact with pickup portion 64 of signal lead 62. This causes a signal voltage to appear on the signal lead. The value of the signal voltage will depend on the value of the source voltage and the location of the contact on the resistive element, as in the previous embodiment. Release of the actuating pressure will allow the coupler to retract the armature, thereby removing the pressure on the membrane. The membrane's natural resilience will cause it to move out of contact with the substrate and break the engagement of the electrodes.

Figure 5:
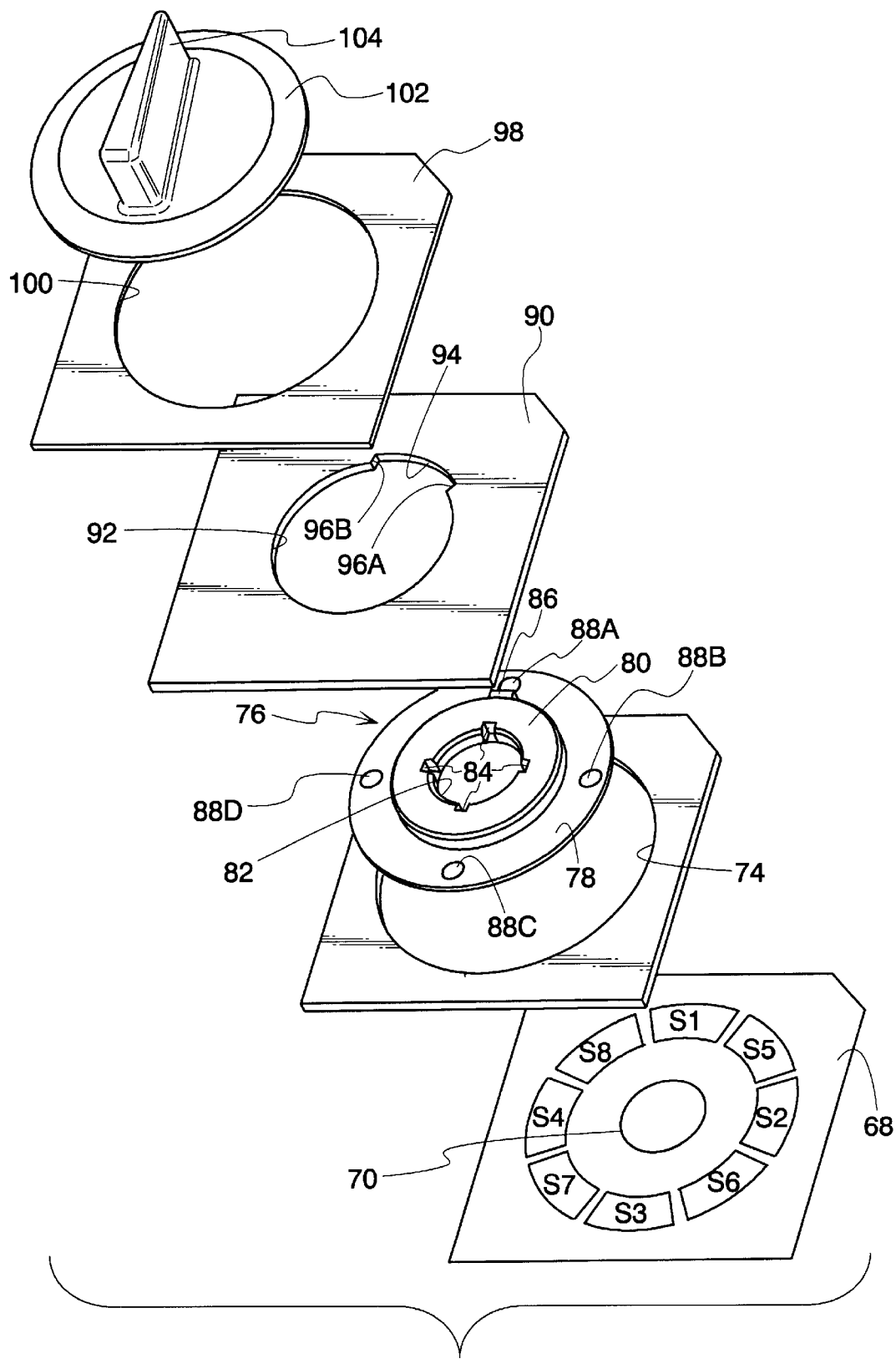
FIG. 5 is a an exploded perspective view of another alternate embodiment of the invention having a left-right switching feature.

FIG. 5 illustrates an alternate embodiment of a directionally sensitive switch. This version is adapted to provide what may be described as a left-right switching feature. The switch will be described from the bottom up. The switch has a substrate 68 with electrodes thereon that includes eight spaced segments labeled Si through S8. Note that segments S5–S8 are interspersed between segments S1–S8 at 45° intervals. There is also a center contact pad 70. Each of the segments S1–S8 and center contact 70 is connected to external electronics by suitable leads (not shown). The lead for the center contact can be between segments if there is room. Otherwise the lead for the center pad may be located on the underside of the substrate 68 with a through hole crossover connection to the center contact 70.

A lower spacer 72 is provided which is similar to spacer 22. Spacer 72 has an opening 74. An armature 76 resides generally within opening 74, that is, the diameter of the opening 74 is somewhat greater than the outside diameter of the armature's rim 78. The armature has an upraised central crown 80. The crown has a central depression 82 with four notches 84 extending therefrom into the crown. The exterior diameter of the crown 80 has a tab 86 extending radially outwardly. The rim 78 includes four downwardly extending bumps or protrusions 88A–88D. The bumps are spaced in four separate quadrants, at 90° intervals. There is also a single, conductive post (not shown in FIG. 5 but it may be similar to that shown in FIG. 8). The central post is on the underside of the armature in the center of the crown. The axial protrusion of the central post is greater than that of the outer bumps 88A–88D. When the armature is in the unactuated position the coupler layer 90 holds the armature, including the central post and outer bumps, spaced from the substrate and from the electrodes. As in the previous instances, the armature is made of conductive, magnetic material.

The next component is a coupler layer 90. The coupler is a magnet. Thus, it attracts the armature 76 to it. An aperture 92 through the coupler 90 has a diameter slightly larger than that of the crown 80 at the rim 78. This permits the crown to fit into and through the aperture. The rim 78, however, has a larger diameter than the aperture 92 so the upper surface of the rim 78 engages the lower surface of the coupler surrounding the aperture 92. This prevents the armature from being separated from the coupler. There is also a notch 94 extending radially somewhat beyond the normal diameter of the aperture 92. The notch 94 is sized to receive the tab 86. The boundary walls of the notch define right and left stops 96A and 96B.

The switch is completed by a non-conductive upper spacer 98 having an opening 100 therein. The opening receives a knob 102. The opening is larger than the knob so the knob can both rotate and tip within the opening. The underside of the knob has tabs (not shown) that engage the notches 84 in the armature crown. This locks the knob to the armature. Alternately the knob could be stamped as part of the armature. The knob may have an upstanding wedge-shaped member 104 or other device which permits a user to conveniently grasp and manipulate the knob.

The use and operation of the left-right switch of FIG. 5. are as follows. The knob 102 is positioned such that the armature tab 86 abuts one of the stops 96A, 96B. The knob can be rotated by a user between these two stop positions. With the knob and armature in the left stop position as shown in FIG. 5, the tab 86 abuts left stop 96B. In this position the armature bumps 88A–88D are aligned over a first group of electrode segments S1–S4, respectively. When a user presses on the periphery of the knob the armature will break away from the coupler layer underneath the point of pressure and contact the corresponding electrode segment. At the same time the central post will move down into engagement with the central contact 70. For example, if the user presses on the knob at the twelve o'clock position, bump 88A will move down into contact with segment S1, shorting that segment to the center contact 70. External electronics will recognize that segment S1 has been shorted and that the actuating pressure had to have been in the vicinity of segment S1. Similarly, if the actuating pressure were at three o'clock, bump 88B would short segment S2. Bump 88C would contact segment S3 and bump 88D would contact segment S4 in the event of actuation above these bumps. Thus, four separate directional signals are available with the armature in the left stop position. The user could also rotate the knob 104 so the tab 86 abuts right position stop 96A. The bumps would then align with the second group of segments S5–S8. Actuating pressure at roughly a one or two o'clock position would cause bump 88A to short segment S5. Bump 88B would activate segment S6, bump 88C would activate segment S7 and bump 88D would activate segment S8.

An ideal application for this switch would be for the left and right mirror adjustment in an automobile. The left, right, up and down movements for the left mirror could come from segments S1–S4, respectively, while similar movements for the right mirror could be derived from segments S5–S8.

An optional addition to the armature 76 is a set of non-conductive fulcrum pieces. The fulcrum pieces would be located on the underside of the armature, interspersed about midway between the bumps 88 and on the about the same diameter as the bumps. Small pieces of rubber could be glued on to serve as fulcrum pieces. The fulcrum pieces would protrude downwardly at least as far as the bumps and preferably slightly farther than the bumps. The purpose of the fulcrum pieces is to deflect actuation pressure above the fulcrum piece toward an adjacent bump 88. For example, if the armature were rotated from the position of FIG. 5 to a position where the bumps aligned with segments S5–S8 and a user depressed the armature above segment S1, a fulcrum piece aligned at that time with segment S1 would cause the armature to rock about the fulcrum and prevent the armature from contacting segment S1. Instead, one of the bumps 88A (aligned with S5) or 88D (aligned with S8) would contact its respective segment depending on which direction the actuating pressure causes the armature to rock. In this regard the fulcrum pieces could be arranged to encourage rocking in a preferred direction. For example, if a closure with segment S5 were desired when a user pressed above S1 (with the armature rotated as described away from the FIG. 5 position), then a fulcrum piece could be located and sized to cause such actuating pressure to rock the armature toward bump 88A and contact with segment S5.

Figure 6:
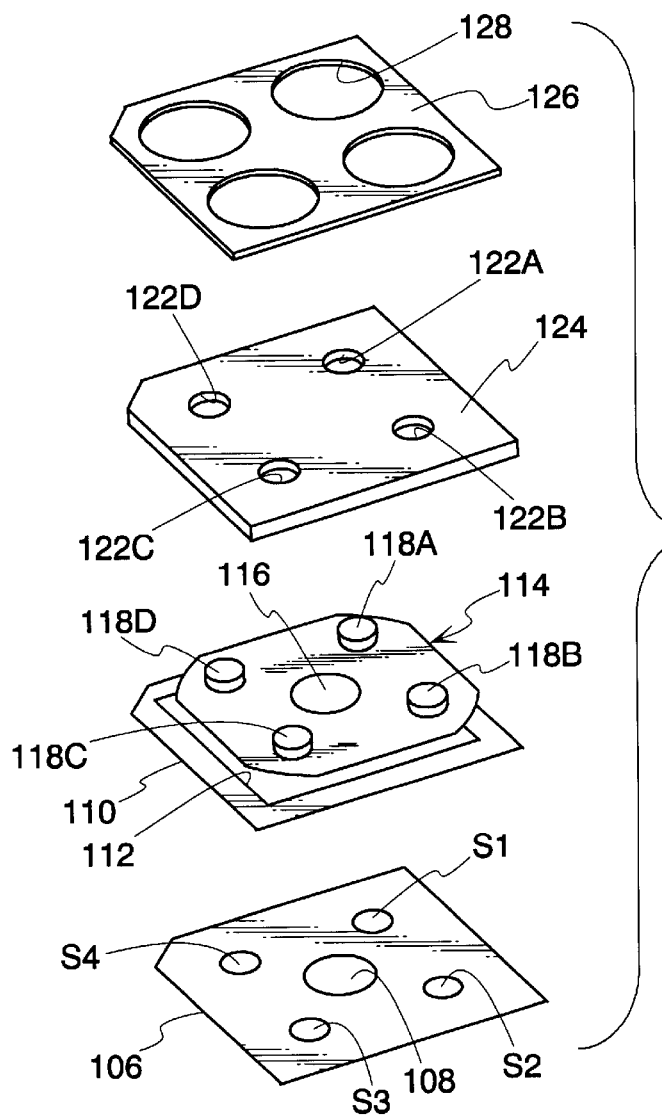
FIG. 6 is an exploded perspective view or a further alternate embodiment of the invention showing a multi-position pushbutton switch.
Figure 7:
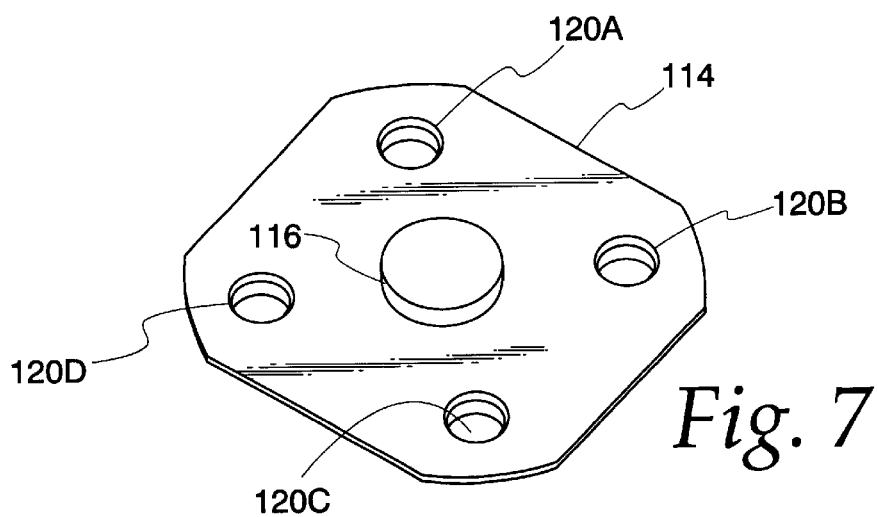
FIG. 7 is an perspective view, on an enlarged scale, of the bottom side of the armature of the switch of FIG. 6.
Figure 8:
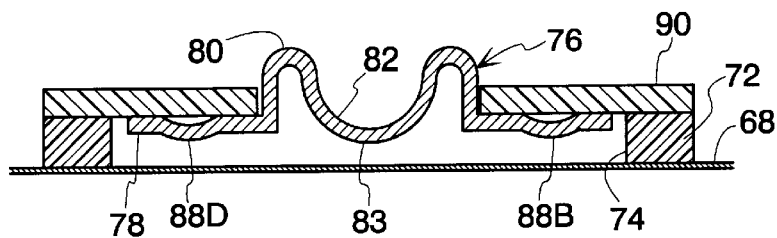
FIG. 8 is section through a further alternate embodiment of the invention, illustrating an armature similar to that of FIG. 7 and having a combined crown and post in a one piece armature.

Turning now to the multi-position pushbutton switch of FIGS. 6 and 7, this embodiment includes a non-conductive substrate 106. On top of the substrate are electrodes including individual segments labeled S1–S4 and a central common contact pad 108. These are connected to external electronics by suitable leads (not shown). A lower spacer 110 of non-conductive material adjoins the substrate with a central opening 112 in the spacer. An armature 114 is made of conductive, magnetic material. It has a conductive, central post 116 extending down from its underside. The armature also has four, separate local crowns 118A–118D. The crowns are located in four quadrants, spaced at 90° intervals to one another. Each crown functions as an independent pushbutton switch. Preferably, the central post 116 and local crowns 118 are stamped from a single piece of metal (as indicated in FIG. 8). Alternately, the crowns 118 could be a separate piece of conductive rubber or plastic glued to the top of the armature 114. As a further alternate there could be four separate outer bumps 120A–120D (FIG. 7) on the underside of the armature aligned with the crowns 118. If such outer bumps are used they have a height less than that of the central post 116 to cause a rocking motion when the switch is actuated.

The local crowns 118 align with openings 122A–122D in a coupler layer 124. The coupler layer is a magnet. The height of the crowns 118 is somewhat greater than the thickness of the coupler layer 124 so the crowns protrude above the layer 124. An optional upper spacer 126 may be placed on top of the coupler layer. Spacer 126 has openings 128 providing access to the local crowns 118. The upper spacer is included to shield against accidental actuation of adjacent switches when an individual crown is pushed. The upper spacer 126, coupler layer 124 and lower spacer 110 could be molded and magnetized as a single piece part to form a monolithic construction. Powdered metal could be used in such a molding process.

The armature is held in the up position by the magnet coupler layer 124 and it is separated from the substrate by the lower spacer 110. The switch is closed by a user pressing on one of the crowns 118 and shorting the corresponding electrode segment to the center contact 108. For example, pressing on crown 118A would short electrode segment S1 to the common contact 108. Releasing the actuating pressure allows the coupler layer 124 to pull the armature up and out of contact with the electrodes. A typical application for this switch would be in a product where many switches are needed in a small space at a minimal cost. Cellular phones are an example. It should be noted that the concept of FIGS. 6 and 7 is applicable to configurations having more or less than the four switches shown. A triangular or bipolar configuration could be used or there might be more than four switches in a single armature.

FIG. 8 illustrates a cross section of an armature, coupler and spacer similar to those of FIG. 5. The switch has a substrate 68 with electrodes (not shown) on its upper surface. A lower spacer 72 has an opening 74. An armature 76 has a rim 78 and an upraised central crown 80. The crown has a central depression 82 on the upper side that also defines a central depending post 83 on the underside of the armature. The notches 84 and tab 86 are not shown in FIG. 8. The rim 78 includes four downwardly extending bumps or protrusions, two of which are shown at 88B and 88D. The bumps are spaced in four separate quadrants, at 90° intervals. Alternately, a continuous, circular ridge could be substituted for the individual bumps. In this embodiment the axial protrusion of the central post 83 is about the same as that of the outer bumps 88. When the armature is in the unactuated position the coupler layer 90 holds the armature, including the central post and outer bumps, spaced from the substrate and from the electrodes. As in the previous instances, the armature is made of conductive, magnetic material.

Figure 9:
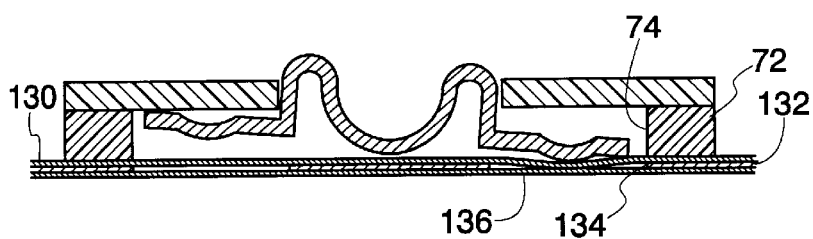
FIG. 9 is yet another embodiment, showing a section through a switch having a membrane switch beneath the conductive bumps of the armature.

There may arise a circumstance in which the armature of FIG. 8 is depressed above one of the bumps but the central post fails to engage the central contact, thus failing to close the switch. One way to avoid that situation is to make the central post larger than the outer bumps, i.e., the central post extends axially farther from the rim than the outer bumps do. Another way to avoid failure to close is to alter the arrangement of the electrodes as in FIG. 9. Here a membrane switch is located under the outer bumps of the armature. The membrane switch comprises a flexible membrane 130 made of polyester or the like. A spacer 132 has openings as at 134. A substrate 136 underlies the spacer. Facing electrodes are formed on the underside of the membrane and upper side of the substrate in the area of the openings. These electrodes are shorted by pressure on the membrane from the outer bumps 88. FIG. 9 shows the armature and membrane switch in an actuated condition. Since the switch is opened and closed by the action of the membrane switch, the armature in this instance reed not be conductive.

Figure 10:
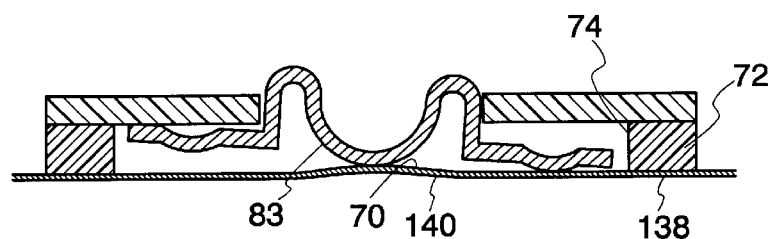
FIG. 10 is section through a switch of another embodiment having an embossed substrate beneath the crown of the armature.
Figure 11:
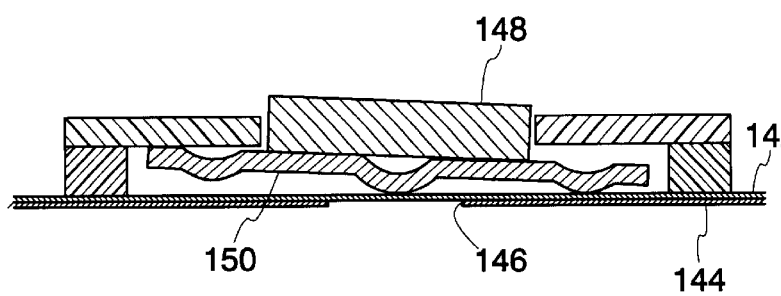
FIG. 11 is a section through a switch of a further embodiment having a spacer beneath the substrate and an opening in the spacer under the crown of the armature.

FIG. 10 shows a further alternate arrangement. This embodiment is similar to FIG. 8 except the substrate 138 is embossed from the bottom side as at 140. The embossment is under the central post 83. The embossment will act as a spring and allow the center contact 70 to remain in contact with the post 83 as the armature is depressed. A similar effect can be obtained by the switch of FIG. 11. Here a flexible substrate 142 is used. It is located on top of a relatively rigid spacer 144 which has an opening 146. The substrate can flex into the opening 146 providing a spring-like effect. FIG. 11 also illustrates a two-piece armature having a separate crown element 148 glued to the armature 150.

Figure 12:
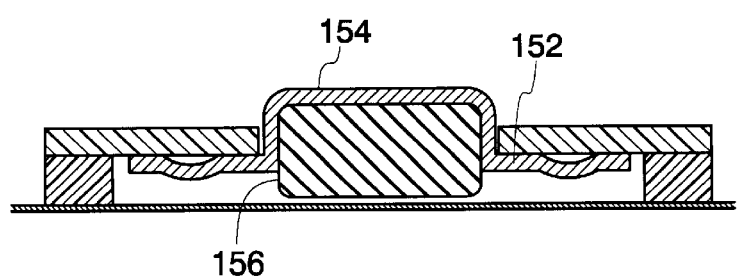
FIG. 12 is a section through yet another embodiment having an armature fitted with a resilient, conductive pad in the crown.
Figure 13:
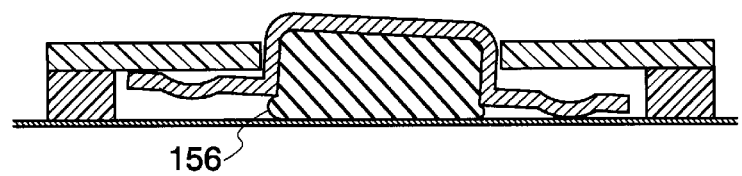
FIG. 13 shows the switch of FIG. 12 in an actuated condition.

FIGS. 12 and 13 illustrate yet another alternate embodiment for providing a resilient central contact between the armature and substrate. Here the resilience is provided in the armature 152 instead of in the substrate. The armature has a crown 154 with a conductive, resilient pad 156 on the underside of the crown. The pad can be made of rubber impregnated with a conductive material to make the pad conductive. As seen in FIG. 13, the pad will deform when actuated, allowing the outer bumps to move into engagement with the electrodes on the substrate.

While a preferred form of the invention has been shown and described, it will be realized that alterations and modifications may be made thereto without departing from the scope of the following claims. For example, as a further alternate to the FIG. 3 embodiment, two separate sets of electrodes could be incorporated into the switch. That is, in addition to the electrodes on the bottom of the membrane and top of the substrate, a second set could be included on top of the membrane and the bottom of the coupler, as shown in FIG. 1.

What is claimed is:

1. An electrical switch, comprising:
    a carrier having a set of electrodes formed on at least one side thereof, the electrodes being arranged to produce different outputs when contacted in different locations;
    a generally planar coupler layer adjacent said one side of the carrier and having an aperture therein;
    a spacer separating the carrier and coupler and defining at least one cavity therein between the carrier and coupler;
    a conductive armature disposed in said cavity and having a rim, the rim defining an axis which is normal to the plane of the couplet layer, one of the coupler and armature being a magnet and the other being made of magnetic material such that the magnetic attraction between the coupler and armature normally holds at least the rim of the armature on the coupler in an open position, wherein the entire armature is spaced from the carrier and the electrodes, the armature being movable to a closed position, wherein a first portion of the rim contacts the electrodes; and
    a knob attached to the armature and extending through the aperture in the coupler layer such that the knob and armature are mounted for rotation about said axis by a user.

2. The switch of claim 1 further comprising a notch on one of the armature, or coupler layer defining first and second stops, and a tab on the other of the armature or coupler layer, the tab being disposed in the notch and rotatable between the stops to define first and second positions of the armature.

3. The switch of claim 1 wherein the armature further comprises a crown upstanding from the rim, the crown extending at least partially into the aperture in the coupler layer.

4. The switch of claim 1 further comprising a post between the armature and carrier.

5. The switch of claim 1 further comprising a plurality of conductive bumps on the rim of the armature in facing relation with the carrier.

6. The switch of claim 1 wherein the set of electrodes comprises a plurality of segments spaced from one another.

7. The switch of claim 1 further comprising a plurality of conductive bumps on the rim of the armature in facing relation with the carrier and wherein the set of electrodes comprises a plurality of segments spaced from one another, a first subset of the segments being aligned with the conductive bumps when the armature is in a first rotational position and a second subset of the segments being aligned with the conductive bumps when the armature is in a second rotational position.

8. An electrical switch, comprising:
    a carrier having a set of electrodes formed on at least one side thereof, the electrodes having a plurality of segments spaced from one another;
    a generally planar coupler layer adjacent said one side of the carrier and having an aperture therein;
    a spacer separating the carrier and coupler and defining at least one cavity therein between the carrier and coupler;
    a conductive armature having a rim which defines an axis which is normal to the plane of the coupler layer, the armature being mounted for rotation about said axis in said cavity, one of the coupler and armature being a magnet and the other being made of magnetic material such that the magnetic attraction between the coupler and armature normally holds at least tie rim of the armature on the coupler in an open position, wherein the entire armature is spaced from the carrier, the armature being movable to a closed position, wherein a first portion of the rim contacts the electrodes; and
    a plurality of conductive bumps on the rim of the armature in facing relation with the carrier.

9. The switch of claim 8 further comprising a knob attached to the armature and extending through the aperture in the coupler layer such that the knob and armature are mounted for rotation by a user.

10. The switch of claim 8 wherein the armature is rotatable between first and second rotational positions, a first subset of the segments being aligned with the conductive bumps when the armature is in a first rotational position and a second subset of the segments being aligned with the conductive bumps when the armature is in a second rotational position.

11. The switch of claim 8 further comprising a notch on one of the armature or coupler layer defining first and second stops, and a tab on the other of the armature or coupler layer, the tab being disposed in the notch and rotatable between the stops to define first and second positions of the armature.

12. The switch of claim 8 wherein the armature further comprises a crown upstanding from the rim, the crown extending at least partially into the aperture in the coupler layer.

13. The switch of claim 8 further comprising a post between the armature and carrier.

* * * * *